Oct. 7, 1924.
R. H. LOCKYER
1,510,995
AMUSEMENT DEVICE
Filed March 7, 1923      6 Sheets-Sheet 5
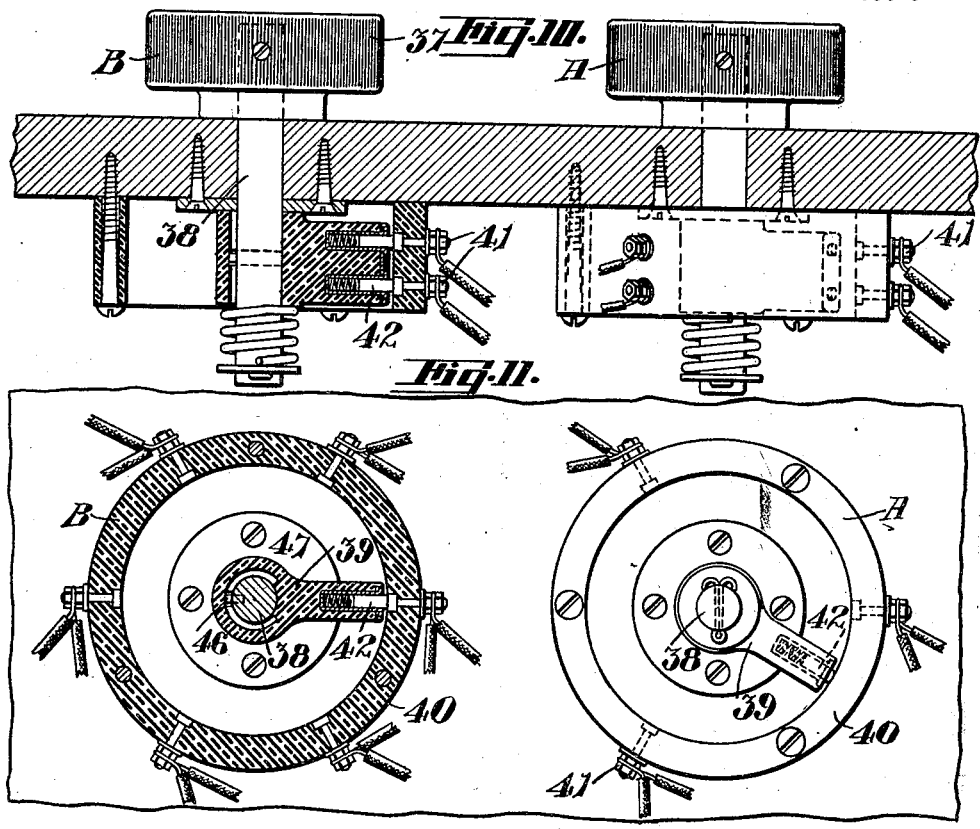
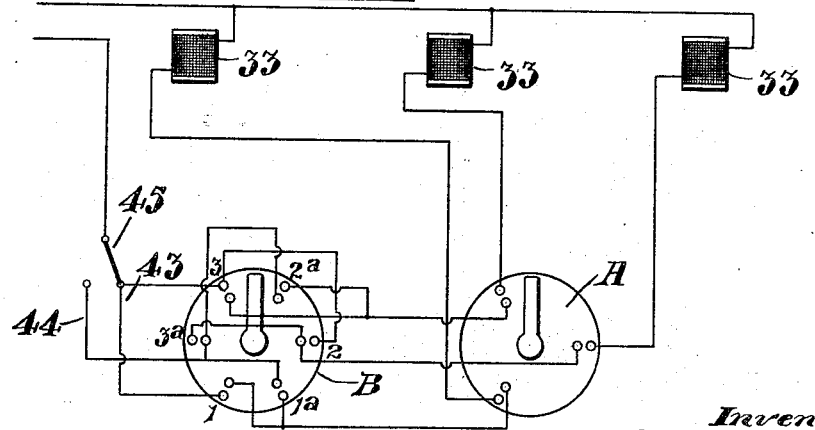
*Inventor.*
ROBERT H. LOCKYER.
By Dewey, Strong
Townsend & Loftus
*Attorneys.*

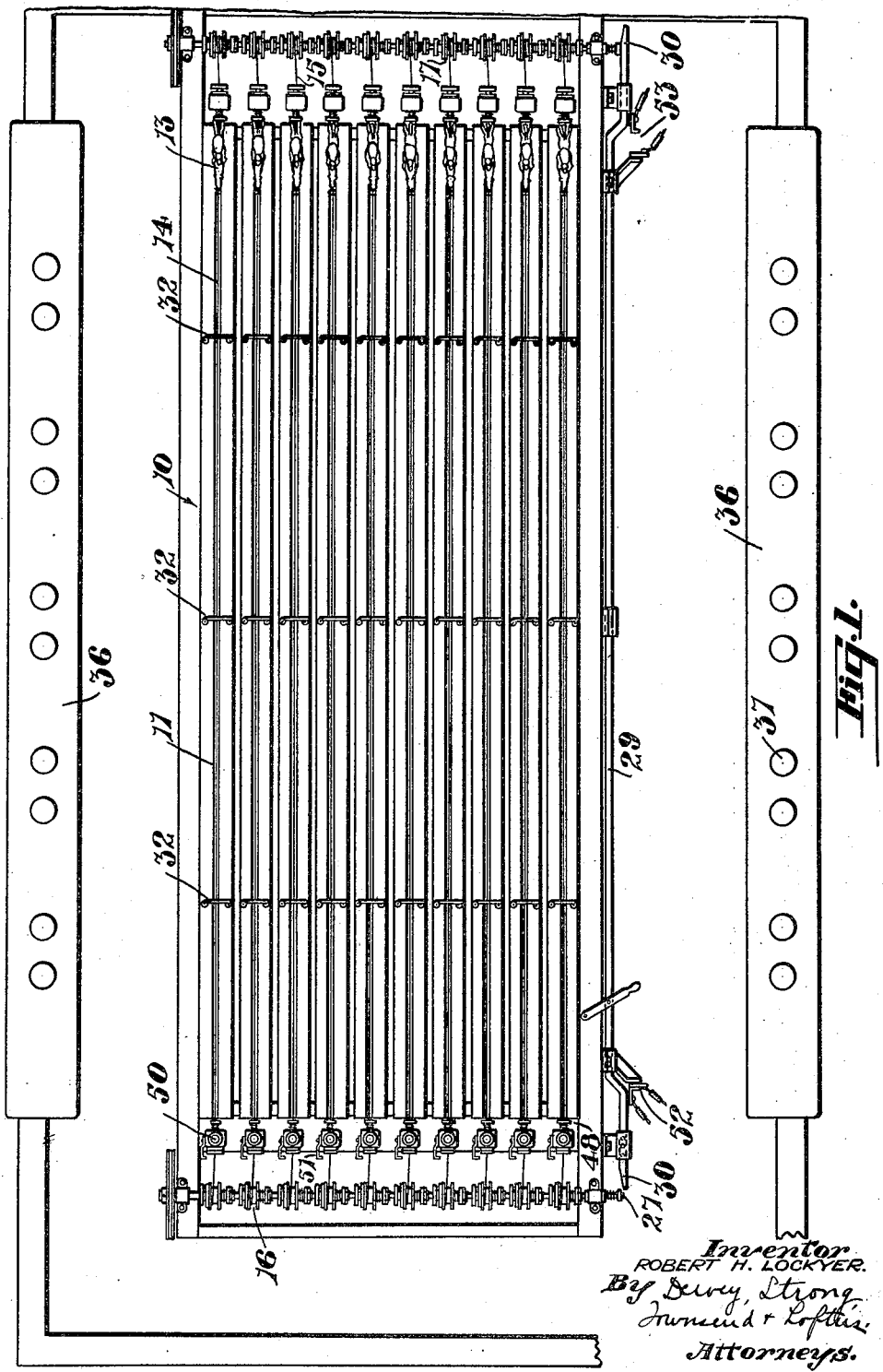

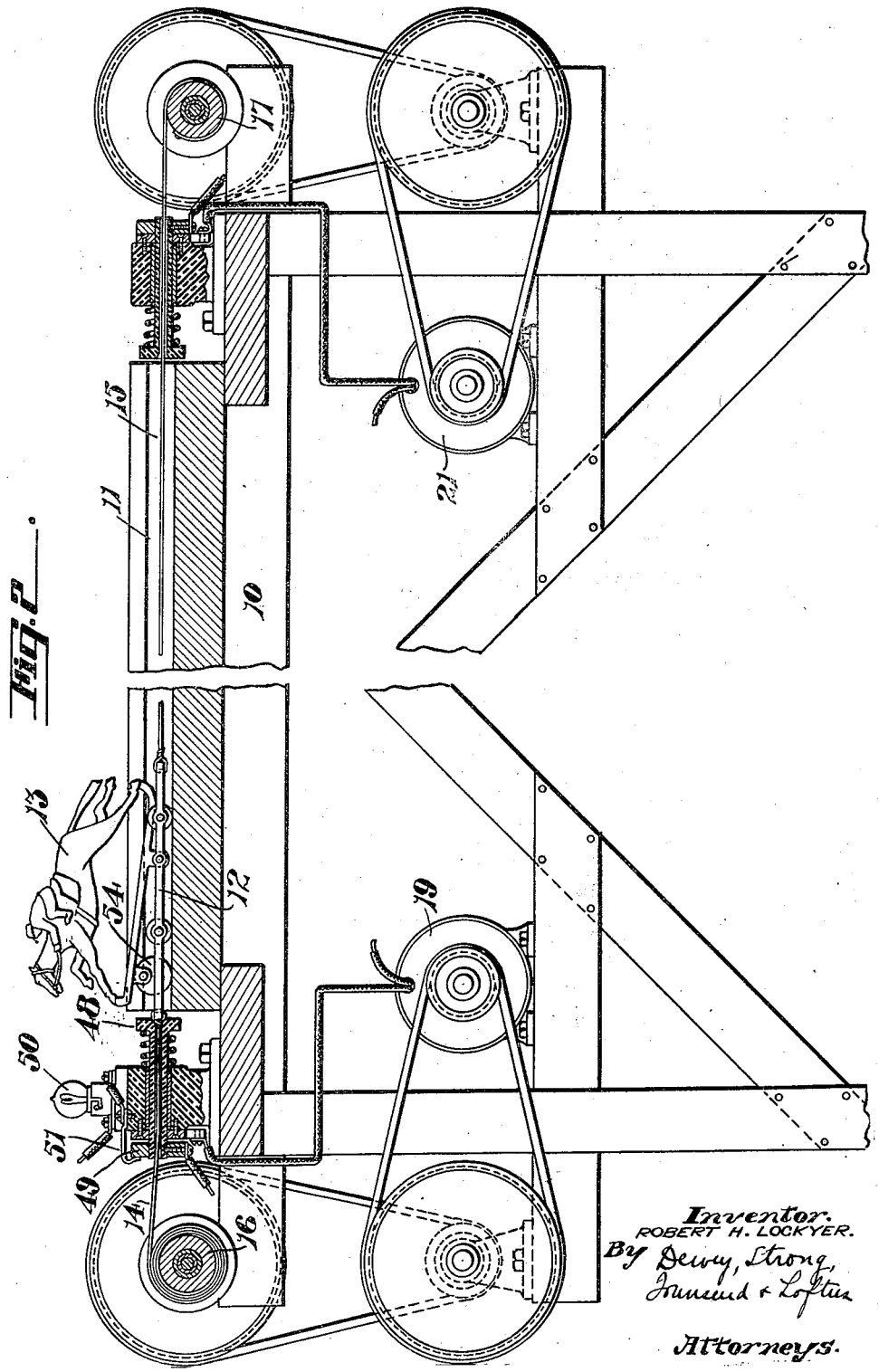

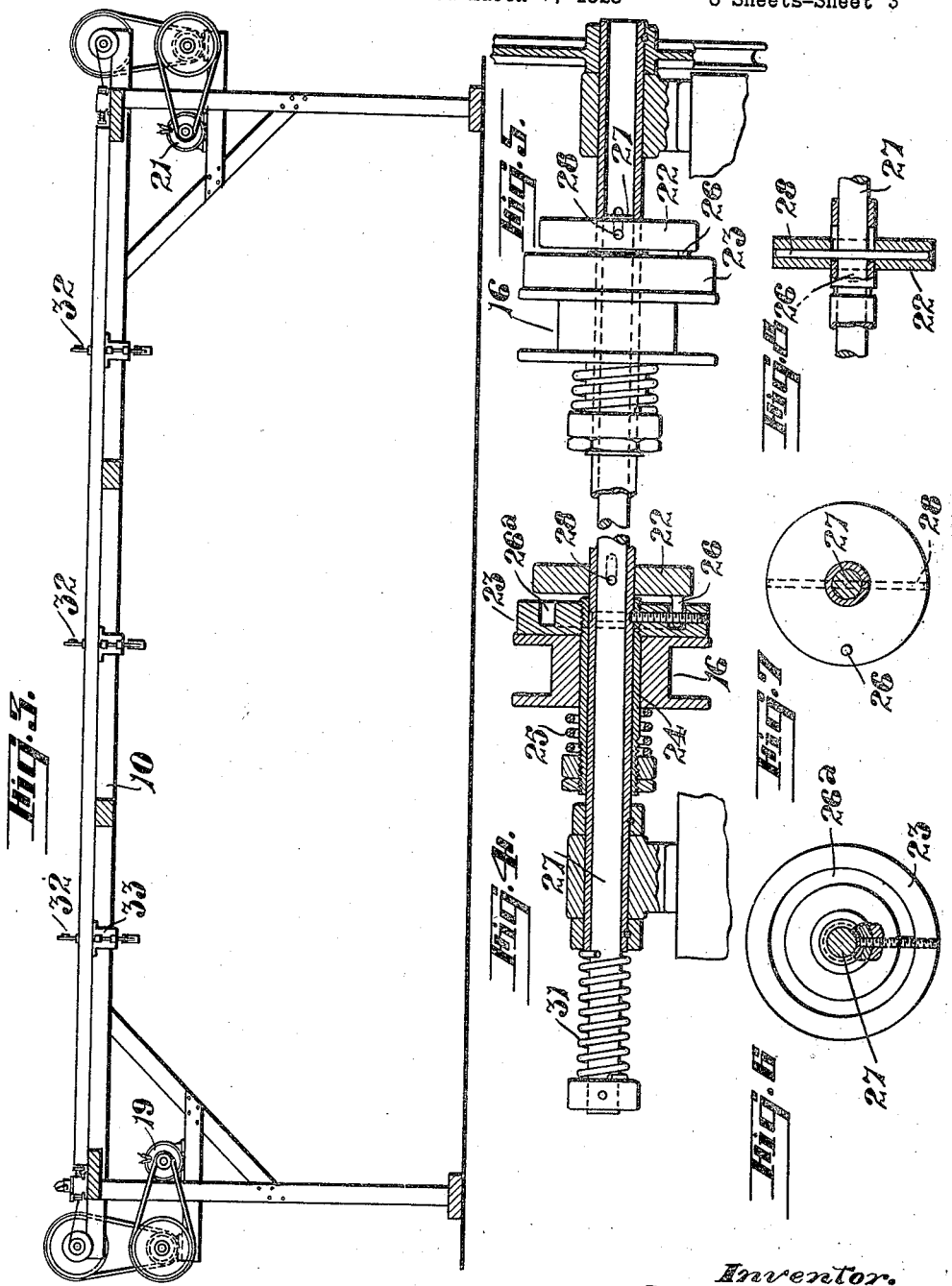

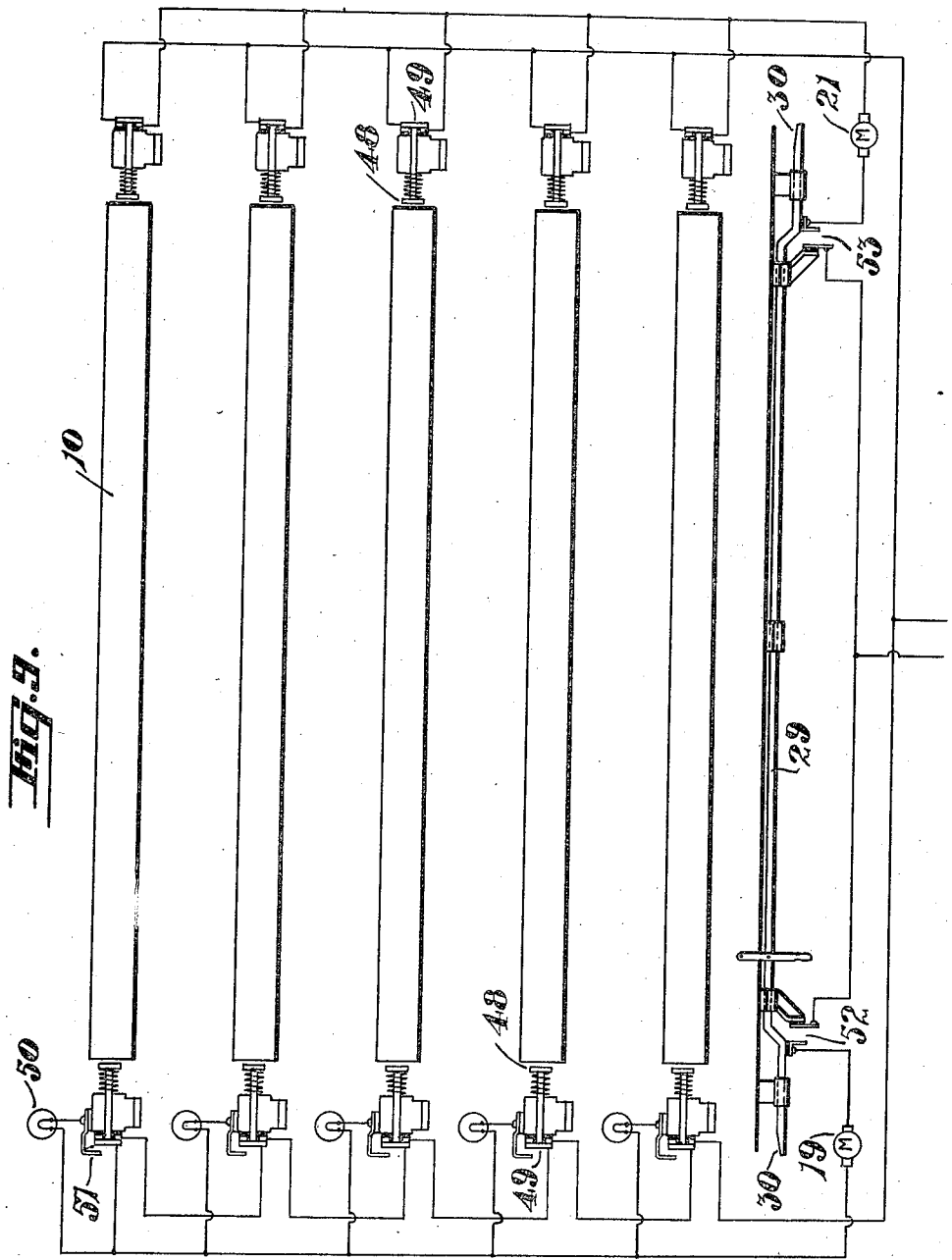

Oct. 7, 1924.  1,510,995
R. H. LOCKYER
AMUSEMENT DEVICE
Filed March 7, 1923   6 Sheets-Sheet 6
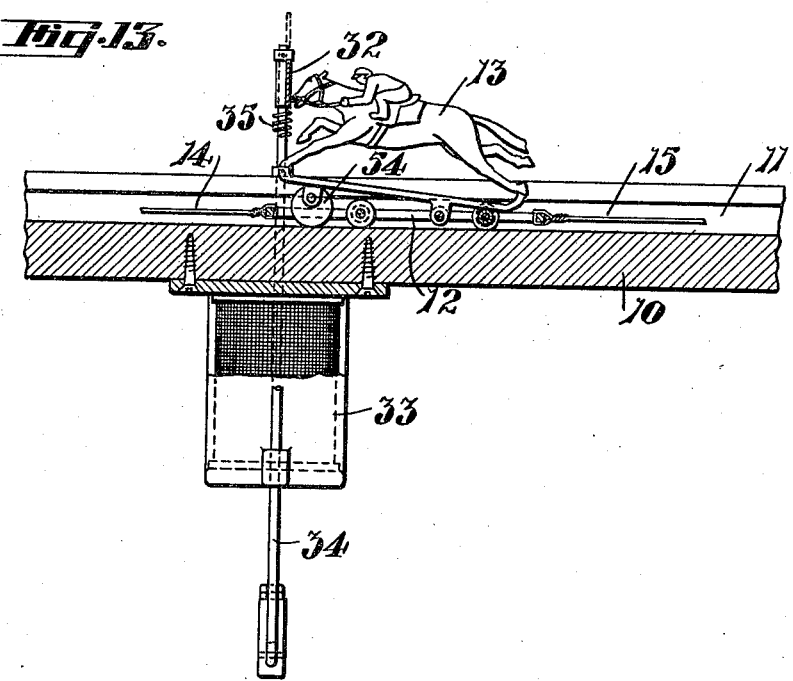
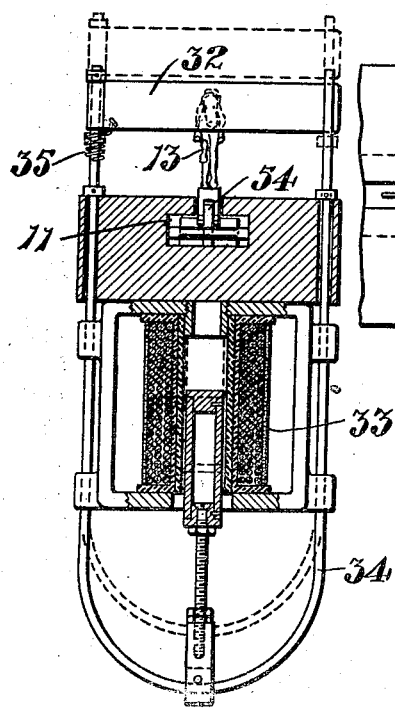
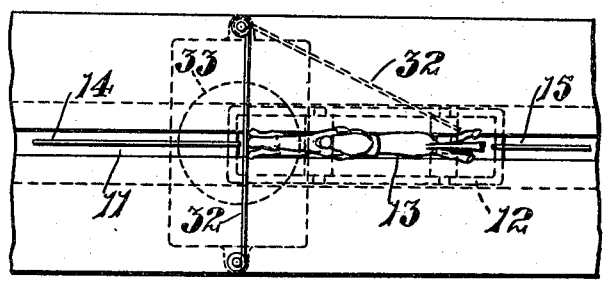
Inventor.
ROBERT H. LOCKYER.
By Dewey, Strong
Townsend + Loftus
Attorneys.

Patented Oct. 7, 1924.

1,510,995

UNITED STATES PATENT OFFICE.

ROBERT H. LOCKYER, OF SAN FRANCISCO, CALIFORNIA, ASSIGNOR OF ONE-HALF TO EMMETT F. WALT, OF SAN FRANCISCO, CALIFORNIA.

AMUSEMENT DEVICE.

Application filed March 7, 1923. Serial No. 623,550.

*To all whom it may concern:*

Be it known that I, ROBERT H. LOCKYER, a citizen of the United States, residing at the city and county of San Francisco and State of California, have invented new and useful Improvements in Amusement Devices, of which the following is a specification.

This invention relates to amusement devices, and more particularly to a mechanical racing device wherein a number of players may each select a racing object, such as a horse, and expedite the movement of the same by a manipulation of certain controls.

The object of the invention is to simulate a hurdle race or steeplechase to the extent that each racing object is confronted by a number of barriers or obstructions which may be removed by manipulation of the controls in the hands of the players.

A further object is to arrange the controls for these barriers so as to prevent detection of the combination necessary to operate the barriers.

In carrying out these objects I provide a number of racing objects, preferably galloping horses, each propelled by a cord or belt which is driven from a motor through friction devices. In the path of each object are a number of barriers, each barrier being removable by electrical contrivances. The electrical contrivances for each set of barriers are controlled by two or more rotatable switches, which must occupy definite relative positions simultaneously in order to remove a particular barrier. There are a plurality of barriers in the way of each racing object and each of the barriers requires a different position and relation of the switches. The switches being freely rotatable and the contacts hidden it requires time and skill to find the proper relative position of the two for putting in operation the means which remove a particular barrier. Mechanism is also provided for quickly and easily returning the racing objects to starting position after the race has been completed.

One form which my invention may assume is exemplified in the following description and illustrated in the accompanying drawings, in which—

Fig. 1 shows a plan view of a device embodying my invention.

Fig. 2 shows a vertical, central, sectional view of the same.

Fig. 3 shows a vertical sectional view.

Fig. 4 shows a longitudinal, sectional view through one of the winding drums and clutch mechanism therefor.

Fig. 5 shows a side elevation of a winding drum and clutch mechanism.

Fig. 6 shows a detail of the driven clutch member.

Figs. 7 and 8 show details of the driving clutch member.

Fig. 9 shows a schematic view in plan of the electrical connections for operating the motors which propel the horses forwardly and backwardly.

Fig. 10 shows a sectional view of a portion of the railing illustrating the rotary switches, one in section and the other in elevation.

Fig. 11 shows an inverted plan view and section of the switches illustrated in Fig. 10.

Fig. 12 shows a diagram of the electrical connections for operating the solenoid magnets which control the barriers.

Fig. 13 shows a sectional view of a portion of the table illustrating a barrier and its operating mechanism.

Fig. 14 shows a view similar to Fig. 13 taken at right angles thereto.

Fig. 15 shows a plan view of the parts illustrated in Fig. 13.

Referring in detail to the accompanying drawings, I show a table 10 fitted with a plurality of longitudinal grooves 11 forming tracks or raceways. In each of the tracks is a roller truck or carriage 12 carrying an object, such as a horse 13. The trucks or carriages are each propelled by cords or belts 14 and 15, one tied to the front of the carriage and running over a forwardly driven winding drum 16, and the other tied to the rear end of the carriage and running over a reversely driven winding drum 17.

The drums at the goal end of the table are arranged upon a hollow shaft 18, which is driven by a motor 19 and the drums at the starting end of the table are arranged upon a hollow drive shaft 20 which is driven by a motor 21. These drums are loosely mounted upon their respective hollow drive shafts and between each drum and its shaft is a clutch device best illustrated in Figs.

4 and 5. This clutch mechanism consists of a driving disk 22 fixed to the hollow drive shaft but slidable thereon, and a driven clutch disk 23 fixed on a sleeve 24 which is loose on the hollow drive shaft.

The sleeve 24 extends through the winding drum and carries a spring 25 which presses the drum against the disk 23 so as to form a friction drive. The drive between the disks 22 and 23 is connected by means of a pin 26 working in openings 26ª. A rod 27 extends through the hollow drive shaft and connects with each driving disk 22 by means of a pin 28 which passes through a slot in the hollow drive shaft. This rod is adapted to be shifted longitudinally for the purpose of disconnecting all of the clutches simultaneously. This is done by a shiftable bar 29 which extends longitudinally of the table and at each end has a beveled extension 30 to co-operate with the adjacent rod 27. The rods are held in extended position by springs 31. When the bar is thrown in one direction it thrusts one of the rods inwardly and allows the other to be extended by its spring, thus disconnecting all of the clutches on one of the drive shafts simultaneously and permitting all of the clutches on the opposite drive shaft to be engaged. The arrangement is such that when one rod is extended the other will be retracted so that the clutches at opposite ends cannot be engaged simultaneously.

In the path of each racing object are a plurality of barriers 32, as best shown in Figs. 13, 14 and 15. When the racing object strikes a barrier its progress is stopped, due to the fact that the cord or belt will, when restrained, cause slippage between the winding drum and the driven clutch disk which is frictionally held against the same. Each racing object being connected to a different winding drum, it is obvious that the stopping of one object will not interfere with the progress of the other objects.

Each barrier is withdrawn by means of a solenoid magnet 33 arranged below the table and having its core or plunger connected to a U-shaped frame 34, which frame extends slidably through the table. The barrier is pivotally mounted at one end on one of the legs of said U-shaped frame and is pressed by means of a spring 35 against the other leg so that the barrier can be swung in one direction only, to-wit, rearwardly. To get the barrier out of the way for the forward progress of the racing object the solenoid magnet is energized to lift the frame 34 into the position shown in dotted lines in Fig. 14. When the energizing circuit is broken the barrier will drop back to obstructing position by reason of gravity and it will swing rearwardly to permit the object to be returned to starting position.

The electrical controls for the solenoid magnets are arranged on a railing 36 which runs longitudinally of the table at either side thereof. These controls consist of two freely rotatable switches A and B for the solenoid of each track. These switches and other electrical connections are best illustrated in Figs. 10, 11 and 12. Each switch includes a turn-button 37 or the like having a stem 38 extending through the railing and carrying an arm 39 at its lower end. This arm swings around within a ring 40, which ring at intervals has a pair of vertically spaced contacts formed on the ends of binding posts 41. The arm in turn carries a pair of vertically spaced spring-pressed pins 42, which are electrically connected to cooperate with the said binding posts to close a circuit between each pair thereof.

There are in the present instance three barriers in each track, each barrier having its own operating magnet and I therefore show three pairs of contacts on each of the switches A and three or more pairs on each of the switches B, these being designated on the drawings as 1, 2 and 3. The electrical connections are shown in Fig. 12 where it will be seen that one of each pair of binding posts on the switch A connects with a solenoid magnet, and the other post of each pair is connected with a post on the switch B. The other post of each pair on the switch B connects with a lead wire 43.

Thus, to actuate a particular magnet the arms of both switches must be so positioned as to make contact between a particular pair of posts, and, since the switches are freely rotatable and their contacts are hidden from view, it requires considerable effort and skill to arrive at the proper combination for operating the magnets.

To increase the difficulty of discovering the proper position of the switch arms for actuating any particular magnet I arrange an auxiliary set of contacts on the switch B, which are indicated in Fig. 12 as 1ª, 2ª and 3ª. One post of each pair of auxiliary contacts is connected with a post on the switch A and the other post of each pair connects with a lead wire 44. The lead wires 43 and 44 extend to a double throw switch 45, and by throwing this switch one set of contacts on the switch B can be cut out and the other set cut in so as to change the combination necessary to operate a particular magnet. The combination may be varied in other ways, as, for instance, by changing the connections between the two switches or between the switches and the magnets.

To further baffle the player I connect the arm 39 to its stem 38 by means of a pin 46 working in a groove 47, which groove extends substantially one-half way around the hub of the arm. Therefore, when the direction of rotation of the turn-button is reversed the relation between the turn-button and the switch arm will be changed, owing to the loose play permitted by the pin and groove.

In order to control the motors 19 and 21 which operate the winding drums I employ the arrangement shown in Fig. 9 where it will be seen that there is a spring-pressed buffer 48 at each end of each track against which the racing object strikes when it reaches the end of the track. Each spring-pressed buffer at the goal end of the track carries at its outer end a contact disk 49, best shown in Fig. 2, all of said contact disks being connected in series with the motor 19. These buffers, when in normal position, close the operating circuit for the motor, but when one of them is struck by a racing object, it is moved, as shown in Fig. 2, so as to break the motor circuit and interrupt the operation of the motor. Therefore, when the first object reaches its goal the motor is stopped and all of the other objects remain standing intermediate the ends of the tracks.

Preferably I provide a lamp 50 at the goal end of the track and connect it in parallel with a number of contact plates 51, one adjacent each buffer so that when a buffer is depressed it closes the lamp circuit, thus giving a signal that the race is finished.

The motor 21 which operates the winding drums for returning the objects is also controlled by buffers similar to those already described, except that the contact disks on the buffers at the starting end of the table are connected in multiple with the motor. Therefore to stop the motor which propels the objects it is necessary that all buffers be depressed, thus insuring that all objects will be returned to starting position.

On the shiftable bar 29 which controls the clutches I arrange at one end a circuit closer 52 for the circuit of motor 19 and at the other end a circuit closer 53 for the circuit of the motor 21 so that when the bar is shifted rearwardly or towards the starting end of the table the clutches for the winding drums 16 will be engaged and the circuit for the motor 19 will be closed, and when the bar is shifted in the opposite direction the clutches for the said winding drums 16 will be thrown out, allowing the clutches for the winding drum 17 to be engaged and closing the circuit for the motor 21.

I prefer to employ a galloping horse as the racing object and the galloping movement is imparted by pivotally mounting the horse on its carriage at one end and at the other end connecting the horse to a roller 54 eccentric thereof.

The operation of the device will be briefly reviewed:

The players take positions on opposite sides of the table in front of each pair of switches, the tracks and switches being correspondingly numbered so that each player can readily identify his horse. The race is started by throwing the shifting bar 29 into the position indicated in Fig. 1, which unclutches the winding drums 17 and throws the forward driving motor into operation. The horses are drawn along by the strings at equal speeds until they reach the first barrier. The player must now manipulate his switches in an effort to get both switches simultaneously into position where the magnet controlling the first barrier will be energized. Having accomplished this the horse will be drawn on to the next barrier and manipulation of the switches must again be resorted to to permit the horse to proceed.

A different relation of the switches is required to close the circuit through the magnet which operates the second barrier, and, likewise, a different relation of the switches is required to energize the magnet for the third barrier. The switch buttons being round and unmarked, and being loosely connected to the switch arms, it is obvious that a player can derive no knowledge of the correct position of the switches for the operation of any particular magnet, and the difficulties of discovering this are greatly increased by the use of the auxiliary set of contacts on one of the switches which can be brought into play by throwing the switch 45.

When a horse reaches the goal the buffer will be depressed and break the motor circuit, thus stopping all of the horses and closing the circuit through the signal lamp. The bar 29 is now shifted in the opposite direction throwing out the clutches for the forward winding drums and allowing the clutches for the reverse winding drums to be engaged and at the same time closing the circuit through the motor 21. The barriers will swing rearwardly to allow the horses to be returned and when all have reached the starting position and all buffers are depressed, the circuit through the motor 21 will be broken.

Various changes in the construction and arrangement of the several parts herein shown and described may be employed without departing from the spirit of my invention as disclosed in the appended claims.

Having thus described my invention, what I claim and desire to secure by Letters Patent is:

1. A racing device comprising a plurality of tracks, a racing object on each track, means for propelling each object, a barrier across each track to stop the progress of the object, means to remove the barriers and a plurality of separately operable controls for each barrier-removing means, said controls being effective in removing the barriers only when a certain definite relative position of the plural members of each barrier-removing means has been arrived at.

2. A racing device comprising a plurality of tracks, a racing object on each track, means for propelling each racing object, a barrier across each track to stop the progress of the object, electrical means for removing the barriers, and separate plural control means for each electrical barrier-removing means, said plural control means for each electrical barrier-removing means being effective only when the plural members thereof have been simultaneously placed in a certain definite relative position.

3. The combination set forth in claim 4 including means to vary the operation of the control means whereby to change their effective positions.

4. A racing device comprising a plurality of tracks, a racing object on each track, means for propelling each racing object, a barrier across each track to stop the progress of the object, electrical means for removing the barrier, and a plurality of freely rotatable switches for controlling the circuit of the electrical means, said switches being connected in series.

5. A racing device comprising a plurality of tracks, a racing object on each track, friction means to propel each object, a barrier in the path of each object, means under the control of the players to remove the barriers whereby to allow the objects to proceed, and means to return the racing objects to starting position, said barriers being freely swingable in a reverse direction to allow the objects to be returned.

6. A racing device comprising a plurality of tracks, a racing object on each track, friction means to propel the objects forwardly comprising a line attached to each object, a winding drum to which the line is connected, a drive shaft carrying all of the drums, friction devices between the drive shaft and each drum, and duplicate means at the opposite end of the track for returning the objects and control means acting to put one set of driving means into operation and simultaneously disconnecting the opposite set so that the drums will turn freely to unwind.

7. A racing device comprising a plurality of tracks, a racing object on each track, friction means to propel each object forwardly comprising a line attached to each object, a winding drum with which the line is connected, a drive shaft on which all of the drums are mounted, a friction disk spring-pressed against each drum, a positive clutch between each friction disk and the drive shaft, duplicate propelling means at the opposite end of the tracks for returning the objects and means for disconnecting all the clutches of the driving means at one end and simultaneously connecting all the clutches of the driving means at the opposite end.

8. A racing device comprising a plurality of tracks, a racing object in each track, electrically-operated means to propel the objects forwardly, electrically-operated means to return the objects to starting position and means to control said electrically-operated driving means, said means being acted upon by the racing objects so that when a single object reaches the terminal of the track the forward driving means will be rendered inoperative and when all of the objects are returned to the starting end of the track the reverse driving means will be rendered inoperative.

9. A racing device comprising a plurality of tracks, a racing object in each track, electrically-operated driving means to propel the objects, a circuit breaker at the end of each track connected in series with the electrically-operated means, a spring-pressed buffer against which each object strikes to render the circuit breaker effective, a signal circuit and a circuit closer at the end of each track connected in parallel with said signal circuit, said circuit closer being carried by the adjacent buffer and being effective to close the signal circuit when the buffer is depressed.

10. A racing device comprising a plurality of tracks, a racing object in each track, electrically-operated means to propel the object forwardly, electrically-operated means to return the objects to starting position, a circuit breaker at the starting end of each track connected in parallel with the electrically-operated means, and a spring-pressed buffer against which each object strikes, said buffers carrying the circuit breakers and bringing them into effective position when all of the buffers have been depressed.

11. In a racing device, a plurality of tracks, a racing object in each track, means to propel each object, said racing objects each comprising a roller carriage, a figure of an animal pivotally mounted thereon at one end, said figure being connected at the opposite end to a roller eccentric thereof whereby a galloping effect is imparted to the animal when the same is moved.

12. In a racing device, a plurality of tracks, a racing object in each track, means to propel each racing object, a barrier in the path of each object to arrest the progress thereof, a solenoid magnet for removing each barrier, the armature of said magnet being connected to said barrier for operating the same, and means under the control of the players for rendering the magnets effective, said control means for each individual track including a pair of freely rotatable members, a concealed circuit closer carried thereby, a ring surrounding the circuit closer and fitted with a number of switch points, certain of said switch points being connected in series with the magnet whereby the circuit will be closed only when the rotatable circuit closers of both switches simultaneously occupy definite relative positions.

13. In a racing device, a plurality of tracks, a racing object in each track, means to propel each racing object, a barrier in the path of each object to arrest the progress thereof, a solenoid magnet for removing each barrier, the armature of said magnet being connected to said barrier for operating the same, means under the control of the players for rendering the magnets effective, said control means for each individual track including a pair of freely rotatable members, a concealed circuit closer carried thereby, a ring surrounding the circuit closer and fitted with a number of switch points, certain of said switch points being connected in series with the magnet whereby the circuit will be closed only when the rotatable circuit closers of both switches simultaneously occupy definite relative positions, and an auxiliary operating circuit for each magnet connected with other switch points on said rings whereby to vary the operation of the switches.

14. A racing device comprising a table, a plurality of tracks extending longitudinally thereof, a racing object in each track, friction means for propelling each racing object, a plurality of barriers in the path of each object to arrest the progress thereof, electrical means for removing the barriers, a railing at each side of the table and control means for the electrical means arranged on said railing, and control means for each track including a pair of freely rotatable switches having their contacts hidden from view and connected in series with the magnets of a particular track.

ROBERT H. LOCKYER.